Patented Mar. 11, 1947

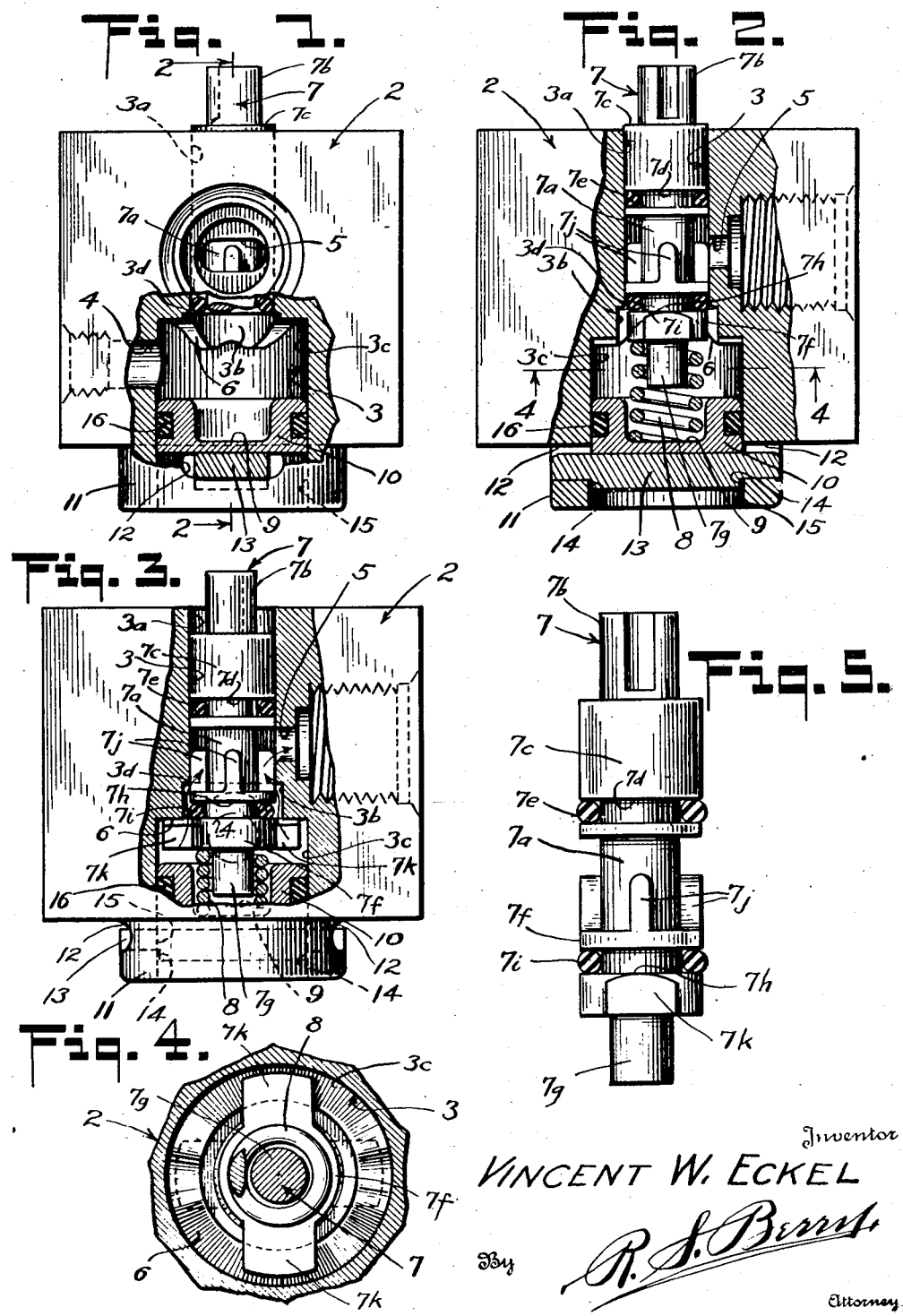

2,417,242

UNITED STATES PATENT OFFICE 2,417,242

PLASTIC VALVE

Vincent W. Eckel, Tujunga, Calif., assignor to Adel Precision Products Corp., a corporation of California Application November 19, 1943, Serial No. 510,985

7 Claims. (Cl. 251—132)

This invention relates to and has for an object the provision of an improved valve which is especially designed for controlling the fluid lines of aircraft, particularly for anti-icing fluid, but is also subject to advantageous use in various other fluid control applications in that it embodies a simple and inexpensive construction consisting of comparatively few parts, is exceedingly light, small, compact and reliable in performance over long periods of use without requiring servicing or replacement of parts thereof.

Another object of my invention is to provide a valve of the character described in which the valve body or housing and the valve member operable therein are produced in finished form without requiring costly machining of the seating surfaces and other parts thereof.

Another object of my invention is to provide a valve of the character described in which a valve body or housing and a combined shaft-valve-cam member (excepting sealing rings on the latter) are made up of but two main separate plastic parts subject to being readily and inexpensively produced in finished form by being molded or cast whereby the valve is extremely light as to weight and made of a non-strategic material without requiring expensive machining and finishing operations and is not subject to electrolytic or other attack prevalent in metal valves.

A further object of my invention is to provide a valve of the character described in which a novel valve member in the form of a yieldable and elastic valve ring carried on a piston-like shaft is movable with the latter into two positions in a bore between intake and outlet ports in such manner that when in one of said positions it will engage the wall of said bore and shut off communication between said ports and in the other position will open the bore between said ports.

Another object is to provide a valve of the character described wherein a one-piece shaft-valve-cam member embodies guide means which closes one end of a bore in a valve body or housing, a piston-like portion having a yieldable elastic valve ring thereon and a cam means adapted to cooperate with cam means formed in the bore for moving the combined member axially upon rotation thereof.

With the foregoing objects in view, together with such other objects and advantages as may subsequently appear, the invention resides in the parts and in the combination, construction and arrangement of parts hereinafter described and claimed, and illustrated by way of example in the accompanying drawing, in which:

Fig. 1 is a fragmentary side elevation of a valve embodying my invention with parts shown in section;

Fig. 2 is a view similar to Fig. 1 but taken at right angles thereto;

Fig. 3 is a view similar to Fig. 2 but taken at right angles thereto and showing the valve in open position;

Fig. 4 is a cross sectional view taken on the line 4—4 of Fig. 2;

Fig. 5 is an enlarged side elevation of the valve-shaft-cam member removed from the valve body or housing.

Referring to the drawing more specifically, it is seen that one embodiment of my invention includes a body member or housing 2, having a valve-receiving bore 3 extending therethrough and intake and outlet ports 4 and 5 communicating with the bore 3. From one surface of this body member a main portion 3a of the bore 3 extends for the greater part of the length of the bore and is of uniform diameter and the outlet port 5 opens into this main portion at a point intermediate the ends of the latter. A counterbore 3b is formed at the inner end of the main portion 3a and a second counterbore 3c is provided between the counterbore 3b and the other surface of the body through which the bore 3 opens. The intake port 4 opens into the side of the counterbore 3c. Cam surfaces 6 are formed at the inner end of the counterbore 3c and extend into the counterbore 3b as shown in Figs. 1 and 2. These two counterbores form the counterbored portion of the bore, in which portion is located the means described later for moving the shaft axially as a result of its rotation.

A combined shaft, valve and cam member 7 is mounted for axial and rotary movement in the bore 3 and includes a shaft portion 7a of smaller diameter than the main portion 3a of bore 3 to provide for free flow of fluid between the shaft portion 7a and the wall of the bore portion 3a.

At a point adjacent but spaced inwardly from the outer end 7b of the member 7 on which end a handle, not shown, may be mounted, is an enlarged piston-like guide 7c having a working fit in the portion 3a of the bore. In this guide is a groove 7d for an annular sealing ring 7e of elastic yieldable material having a circular cross section, thereby closing one end of the bore 3.

A similar piston-like enlargement 7f is provided on the member 7 at a point near but spaced inwardly from the other end 7g of said member and serves as a valve member since it has a working fit in the portion 3a of bore 3 and is provided with a groove 7h in which is mounted a valve ring 7i of yieldable elastic material having a circular cross section. Extending axially of the shaft portion 7a from points where formed integral with the enlargement 7f are guide vanes 7j having a working fit with the wall of portion 3a of bore 3.

Formed on the member 7 so as to project radially outward from the enlargement 7f are two cam arms 7k which are adapted to traverse cam surfaces 6 as shown in Figs. 3 and 4.

One end of a spring 8 telescopes the end 7g of member 7 and engages the enlargement 7f to urge the valve ring 7i into a seated position in the main portion 3a of bore 3. The other end of the spring 8 seats in a depression 9 in a plug 10 axially movable in and closing the outer end of the counterbore 3c. A part of the plug 10 fits in a tubular projection 11 on the body 2 and this projection is provided on opposite sides with openings 12 through which a lock bar 13 is extended to hold the plug in place. The openings 12 are of such size that the bar 13 may be shifted therein axially of the projection 11 while abutting the outer face of the plug 10 so that shoulders 14 on the bar may be moved into and out of locking engagement with the inner periphery 15 of the projection as will be apparent with reference to Figs. 1 and 2. A sealing ring 16 is carried by the plug 10 to provide a fluid tight seal around the plug.

When the valve is closed the upper part of the enlargement 7f and the valve ring 7i are sealingly engaged with or "seated" on the wall of the main bore 3a as best shown in Fig. 2, and the cam arms 7k rest on the low or concave portions 6a of the cam surfaces 6, these parts being held in such position by means of the spring 8.

When in this closing position the valve ring 7i lies in engagement with the inner extremity of the cylindrical portion of the main bore 3a and in part opposite a rounded portion 3d at the juncture of the main bore 3a and the counterbore 3b. This rounded portion 3d has a radius such that the valve ring will not be damaged in being moved past it into and out of closed position.

Pressure of the fluid in the counterbore 3b is effective against the valve ring 7i to urge it into a seated or closed position and also expand it against the wall of the main bore 3a thereby providing a leak-proof seal when the valve is in its closed position. This action is due to the exposure of part of the ring 7i to the annular space accorded between the wall of counterbore 3b and the periphery of that part of the piston-portion 7f which is disposed in said counterbore as will be seen in Fig. 2.

On turning the member 7 from position shown in Fig. 2 to position shown in Fig. 3, the cam arms 7k will traverse the convex portions of the cam surfaces 6 thereby causing the member 7 to be axially moved so that the enlargement 7f and the valve ring 7i are moved out of the main bore 3a into the counterbores 3b and 3c to thus open the valve. Fluid will now flow from counterbores 3c and 3b through the space between the inner end of main bore 3a and to top of the enlargement 7f into the main bore, thence out through the discharge port 5.

To shut off the valve, the member 3 is turned to bring the arms 7k from position shown in Fig. 3 to position shown in Fig. 2, onto the low points of the cam surfaces and during such movement the spring 8 urges the portion 7f and valve ring 7i into the main bore 3a, aided by the pressure of the fluid in the counterbore 3b, thereby closing the valve. The counterbore 3b affords a simplified fluid passage means which would otherwise have to be produced by more expensive machinery operations.

It should be noted that the particular construction and arrangement of the valve elements hereof makes it highly practicable to construct the body 2 and the shaft-valve unit 3 of Bakelite or some other suitable plastic material which may be easily and inexpensively molded or cast in finished form without machining or other finishing operations usually required where such parts are made of metal. Also, it is to be seen that the shaft together with its valve portions can be inserted as a unit into the bore that passes through the valve body.

By using an elastic rubber or synthetic valve ring of circular cross section in the manner here shown I am able to provide a most efficient "plastic" or non-metallic valve which will be most reliable as to performance over long periods of use due to the small amount of wear characteristic of a valve ring and valve construction of this character and its immunity to electrolytic or other attack.

While I have shown and described a specific embodiment of my invention I do not limit myself to the exact details of construction set forth, and the invention embraces such changes, modifications and equivalents of the parts and their formation and arrangement as come within the purview of the appended claims.

I claim:

1. In a valve, a body member having a bore provided with a main portion, a counterbore at one end of said main portion, a second counterbore contiguous the first named counterbore, a port opening into said main portion, a port opening into said second counterbore, a shaft rotatably and axially movably mounted in said bore, a piston-like enlargement on said shaft movable from said main portion into said first named counterbore and vice versa and having a peripheral groove intermediate its ends, a valve ring of yieldable elastic material mounted in said groove and adapted to be moved into and out of sealing contact with the wall of said main portion on rotational and axial movement of said shaft, means operable upon rotation of said shaft to move said shaft axially, whereby to move the enlargement and said valve ring into and out of position sealing said main portion at a point between said ports, including a cam surface formed in the first named counterbore, an arm on said shaft arranged to traverse said cam surface on rotation of the shaft, and a spring arranged to urge the shaft into position to seat said valve ring in said main portion.

2. In a valve, a body member having a bore extending therethrough formed with a main portion extending the greater length of the bore and a counterbored portion contiguous one end of the main portion, an intake port opening into the counterbored portion, an outlet port leading from the bore at a point intermediate the ends of the main portion, a shaft rotatably and axially movably mounted in said bore, a piston-like enlargement on said shaft having a working fit in and closing the end of the bore opposite to the counterbore, a portion of the shaft extending beyond said enlargement and out of said end of the bore whereby the shaft may be rotated, a yieldable sealing means carried by said enlargement for sealing engagement with the wall of the bore, another piston-like enlargement on said shaft having a working fit in said main portion of the bore between said outlet port and the juncture of said main portion and said counterbored portion, a valve ring of yieldable elastic material carried by the second named piston-like enlargement so as to seat against the wall of the main portion of the bore, means operable upon rotation of said shaft to move the shaft axially whereby to move the valve ring and second enlargement from seated position in said main portion into open position in said counterbored portion, and vice versa.

3. In a valve, a body member having a bore extending therethrough formed with a main portion extending the greater length of the bore and a counterbored portion contiguous one end of the main portion, an intake port opening into the counterbored portion, an outlet port leading from the bore at a point intermediate the ends of the main portion, a shaft rotatably and axially movably mounted in said bore, a piston-like enlargement on said shaft having a working fit in and closing the end of the bore opposite to the counterbore, a portion of the shaft extending beyond said enlargement and out of said end of the bore whereby the shaft may be rotated, a yieldable sealing means carried by said enlargement for sealing engagement with the wall of the bore, another piston-like enlargement on said shaft having a working fit in said main portion of the bore between said outlet port and the juncture of said main portion and said counterbored portion, a valve ring of yieldable elastic material carried by the second named piston-like enlargement so as to seat against the wall of the main portion of the bore, means operable upon rotation of said shaft to move the shaft axially whereby to move the valve ring and second enlargement from seated position in said main portion into open position in said counterbored portion, and vice versa, said means including cam surfaces in said counterbored portion, and coacting cam arms on said shaft arranged to traverse said surfaces on rotation of said shaft, and a spring arranged to urge said cam arms and cam surfaces into contact with each other.

4. In a valve, a body member having a bore extending therethrough formed with a main portion extending the greater length of the bore and a counterbored portion contiguous one end of the main portion, an intake port opening into the counterbored portion, an outlet port leading from the bore at a point intermediate the ends of the main portion, a shaft rotatably and axially movably mounted in said bore, a piston-like enlargement on said shaft having a working fit in and closing the end of the bore opposite to the counterbore, a portion of the shaft extending beyond said enlargement and out of said end of the bore whereby the shaft may be rotated, a yieldable sealing means carried by said enlargement for sealing engagement with the wall of the bore, another piston-like enlargement on said shaft having a working fit in said main portion of the bore between said outlet port and the juncture of said main portion and said counterbored portion, a valve ring of yieldable elastic material carried by the second named piston-like enlargement so as to seat against the wall of the main portion of the bore, means operating when the shaft is rotated, for moving the shaft axially to move the valve ring and second enlargement from seated position in said main portion into open position in said counterbored portion and vice versa, including cam surfaces in said counterbored portion, cam arms on said shaft arranged to traverse said surfaces on rotation of said shaft, a spring arranged to urge said shaft into position to seat said valve ring in said main portion of the bore, a plug axially movable in and closing the other end of said bore, said spring having one end engaged with the inner end of said plug, and a locking member removably mounted on the body member and engaging the outer end of said plug to hold it in said bore.

5. In a valve, a valve body member having a bore therein, a shaft having a piston-like enlargement spaced inwardly from one end thereof and adapted to have a working fit in said bore while said end projects from one end of the bore, a groove in said enlargement, a sealing ring mounted in said groove for sealing contact with the wall of said bore, another piston-like enlargement on said shaft at a point spaced inwardly of the other end of the shaft and spaced axially of the first named enlargement and having a working fit in said bore, said second enlargement having a groove therein, a valve ring of yieldable elastic material mounted in the last named groove for sealing contact with a portion of said bore, said bore having an enlarged portion into and out of which said ring is movable with said second enlargement on rotary and axial movement of said shaft, ports leading into said bore, and means operable on rotation of said shaft for moving said shaft axially in said bore to move said valve ring from sealing contact with said bore into said enlargement and vice versa to control the flow of fluid through said bore between said ports.

6. In a valve, a body member having a bore provided with a main portion, a counterbore at one end of said main portion, and a second counterbore contiguous the first named counterbore, a port opening into said main portion, a port opening into said second counterbore, a shaft rotatably and axially movably mounted in said bore, a piston-like structure carried by said shaft and longitudinally movable from said main portion into said first named counterbore and vice versa, said piston-like structure sealing said main portion against fluid flow between said ports when positioned therein, means operable upon rotation of said shaft to a predetermined position to move the shaft and its piston like structure out of sealing relationship with said main portion at a point between said ports and other means effective upon rotation of said shaft to another position to move said shaft and piston like structure axially into sealing relation with said main portion, both of said means being disposed in said second counterbore.

7. In a valve, a body member having a bore extending therethrough formed with a main portion extending the greater length of the bore and a counterbored portion contiguous one end of the main portion, an intake port opening into the counterbored portion, an outlet port leading from the bore at a point intermediate the ends of the main portion, a shaft rotatably and axially movably mounted in said bore, a piston-like enlargement on said shaft having a working fit in and closing the end portion of the bore opposite to the counterbore, a portion of the shaft extending beyond said enlargement and out of said end portion of the bore whereby the shaft may be rotated, a second piston-like enlargement on said shaft having a working fit in said main portion of the bore between said outlet port and the juncture of said main portion and said counterbored portion, said shaft being insertable as a unit into its operative position together with cam means integral therewith, and said bore having its counterbored portion furnished with a cam portion to cooperate with said cam means on said shaft to cause rotation of the latter to move said second enlargement from a seated position in said main portion of the bore into an open position in aforesaid second counterbore thereof, said bore together with its counterbored portion forming a passage which opens out at opposite sides of said valve body and the aforesaid ports being leading radially from said passage.

VINCENT W. ECKEL.

REFERENCES CITED

The following references are of record in the file of this patent:

UNITED STATES PATENTS

| Number | Name | Date |
|---|---|---|
| 430,689 | Rigg | June 24, 1890 |
| 832,178 | Weinland | Oct. 2, 1906 |
| 1,241,989 | Kelly | Oct. 2, 1917 |
| 644,473 | Sellers | Feb. 27, 1900 |
| 1,653,369 | Murphy | Dec. 20, 1927 |
| 1,369,754 | Nixon | Feb. 22, 1921 |
| 1,029,963 | Angier | June 18, 1912 |